United States Patent
Manz et al.

(10) Patent No.: US 11,981,189 B2
(45) Date of Patent: May 14, 2024

(54) METHOD FOR CONTROLLING A PLURALITY OF ASSIGNED ELECTRICALLY CONTROLLED TRANSMISSION SWITCH ELEMENTS OF A FIRST SET IN A VEHICLE SUNROOF AND TO A SUNROOF FOR CONTROL BY SUCH A METHOD

(71) Applicant: SAINT-GOBAIN GLASS FRANCE, Courbevoie (FR)

(72) Inventors: Florian Manz, Aachen (DE); Rayan Hammoud, Cologne (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 344 days.

(21) Appl. No.: 17/426,021

(22) PCT Filed: Jan. 14, 2020

(86) PCT No.: PCT/EP2020/050743
§ 371 (c)(1),
(2) Date: Jul. 28, 2021

(87) PCT Pub. No.: WO2020/156795
PCT Pub. Date: Aug. 6, 2020

(65) Prior Publication Data
US 2022/0111706 A1    Apr. 14, 2022

(30) Foreign Application Priority Data
Jan. 28, 2019   (EP) ..................... 19153929

(51) Int. Cl.
*B60J 3/04*    (2006.01)
*B60J 7/043*   (2006.01)
(Continued)

(52) U.S. Cl.
CPC ............... *B60J 3/04* (2013.01); *B60J 7/043* (2013.01); *B60K 35/10* (2024.01); *B60R 16/023* (2013.01)

(58) Field of Classification Search
CPC ..................................... B60J 3/04; B60J 7/043
(Continued)

(56) References Cited

U.S. PATENT DOCUMENTS 9,365,161 B2      6/2016  Mannheim Astete et al.
2012/0307337 A1*  12/2012 Bartug .............. B32B 17/10302
                                                              359/245
(Continued)

FOREIGN PATENT DOCUMENTS

DE    10 2011 002801 A1    7/2012
DE    10 2011 003256 A1    8/2012
(Continued)

OTHER PUBLICATIONS

International Search Report as issued in International Patent Application No. PCT/EP2020/050743, dated Apr. 29, 2020.
(Continued)

*Primary Examiner* — Sang V Nguyen
(74) *Attorney, Agent, or Firm* — Pillsbury Winthrop Shaw Pittman LLP

(57) ABSTRACT

A method controls a plurality of assigned electrically controlled transmission switch elements of a first set in a vehicle sunroof.

10 Claims, 4 Drawing Sheets

Figure 1:
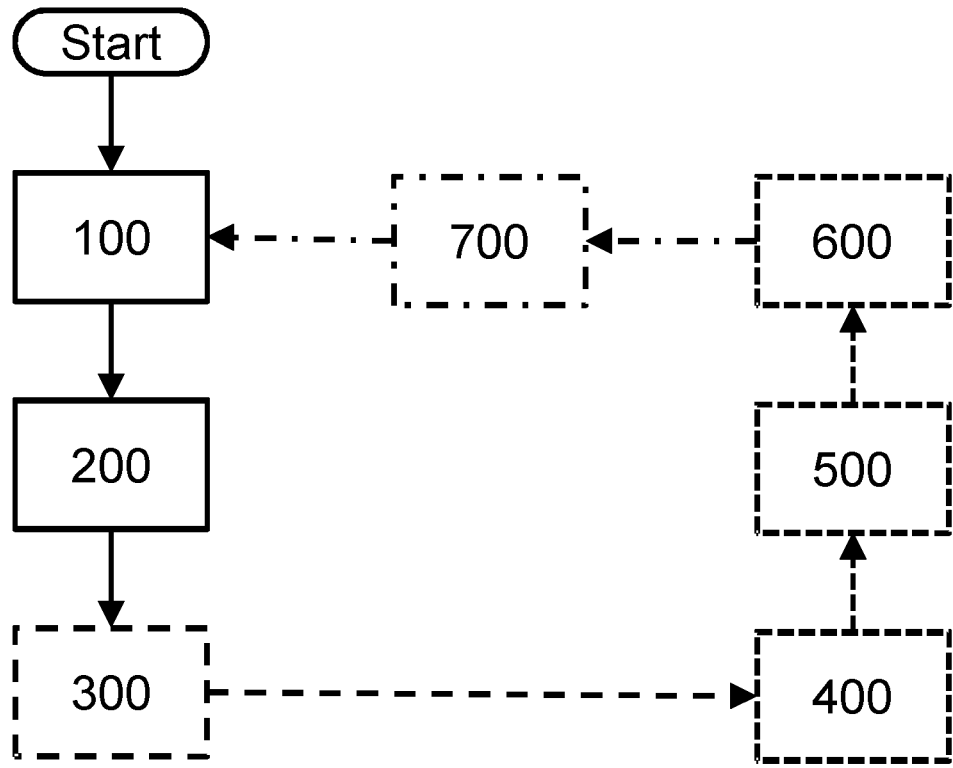

(51) Int. Cl.
B60K 35/10 (2024.01)
B60R 16/023 (2006.01)

(58) Field of Classification Search
USPC .......................................................... 307/10.1
See application file for complete search history.

(56) References Cited

U.S. PATENT DOCUMENTS

| | | | |
|---|---|---|---|
| 2013/0038093 A1* | 2/2013 | Snider | B62D 25/06 |
| | | | 296/219 |
| 2015/0367782 A1* | 12/2015 | Mannheim Astete | |
| | | | G02F 1/1333 |
| | | | 349/12 |
| 2020/0108700 A1* | 4/2020 | Flanigan | B60J 3/04 |
| 2020/0174293 A1* | 6/2020 | Labrot | G02F 1/1334 |

FOREIGN PATENT DOCUMENTS

| | | | |
|---|---|---|---|
| DE | 10 2013 001334 A1 | 7/2014 | |
| EP | 3 429 876 A1 | 1/2019 | |
| JP | S60-87996 U | 6/1985 | |
| JP | H03-121414 | * 5/1991 | ............... B60J 3/04 |
| JP | H03-121414 A | 5/1991 | |
| JP | 2007-001337 | * 1/2007 | ............... B60H 1/32 |
| JP | 2007-001337 A | 1/2007 | |
| JP | 2018-507471 A | 3/2018 | |
| JP | 2018-122675 A | 8/2018 | |
| WO | WO 2015/098312 A | 7/2015 | |
| WO | WO 2017/157626 A1 | 9/2017 | |
| WO | WO 2018/182676 A1 | 10/2018 | |

OTHER PUBLICATIONS

Notice of Reasons for Rejection as issued in Japanese Patent Application No. 2021-543445, dated Oct. 4, 2022.
Examination Report as issued in Indian Patent Application No. 202117030032, dated Mar. 24, 2022.

* cited by examiner

METHOD FOR CONTROLLING A PLURALITY OF ASSIGNED ELECTRICALLY CONTROLLED TRANSMISSION SWITCH ELEMENTS OF A FIRST SET IN A VEHICLE SUNROOF AND TO A SUNROOF FOR CONTROL BY SUCH A METHOD

CROSS-REFERENCE TO RELATED APPLICATIONS

This application is the U.S. National Stage of PCT/EP2020/050743, filed Jan. 14, 2020, which in turn claims priority to European patent application number 19153929.5 filed Jan. 28, 2019. The content of these applications are incorporated herein by reference in their entireties.

The invention relates to a method for controlling a plurality of assigned electrically controlled transmission switch elements of a first set in a vehicle sunroof and to a sunroof for control by such a method.

It is known to equip vehicles with sunroofs. However, depending on the solar radiation, there are, demonstrably, situations in which direct exposure of vehicle occupants or other equipment is undesirable.

For this purpose, in the past, controllable elements were developed with which the transparency properties can be designed to be switchable.

An exemplary switchable transparency element related to a windshield is known from WO 2017/157 626 A1 of the applicant. An exemplary sunroof is known from the German patent application DE 10 2011 002 801 A1 and U.S. Pat. No. 9,365,161 B2.

However, there are situations in which not all occupants benefit equally from a change in transparency properties.

Known from the international patent application WP 2018/182 676 A1 is a method for controlling the coloring of a vehicle window as a function of occupancy of the vehicle, position and direction of sunlight. Known from the German patent application DE 10 2013 001 334 is gesture-controlled darkening of the windshield. Switched-control of a sun wedge in a windshield is known from the German patent application DE 10 2011 003 256 A1.

In addition, it should be noted that there is little space available for control elements.

Against this background, an object of the invention is to provide an improved sunroof and control by a corresponding method.

The object is accomplished by a method for controlling a plurality of assigned electrically controlled transmission switch elements of a first set in a vehicle sunroof, wherein the transmission switch elements of the first set are arranged one behind the other, wherein a first peripheral transmission switch element and a second peripheral transmission switch element are provided, wherein at least one first switch element and one second switch element are available for control, comprising the step of receiving a first switching state of the first switch element within a predetermined time, wherein, if all transmission switch elements of the first set are opaque, the second peripheral transmission switch element is switched to transparent; if all transmission switch elements of the first set are transparent, the second peripheral transmission switch element is switched to opaque; if the first peripheral transmission switch element is opaque and the second peripheral transmission switch element is transparent, the transmission switch element that is immediately adjacent a transparent transmission switch element of the first set is switched to transparent, the step of receiving a first switching state of the second switch element within a predetermined time, wherein, if all transmission switch elements of the first set are opaque, the first peripheral transmission switch element is switched to transparent; if all transmission switch elements of the first set are transparent, the first peripheral transmission switch element is switched to opaque; if the second peripheral transmission switch element is opaque and the first peripheral transmission switch element is transparent, the transmission switch element that is immediately adjacent a transparent transmission switch element of the first set is switched to transparent.

I.e., the invention makes it possible to provide effective control of a plurality of transmission switch elements with a small number of switch elements in a shift-like sequence in both directions.

In one embodiment of the invention, the method further has the step of receiving a sequence of first switching states of the first switch element within a predetermined time, wherein, if the first peripheral transmission switch element is transparent, all transmission switch elements of the first set are switched to opaque; if the first peripheral transmission switch element is opaque, all transmission switch elements of the first set are switched to transparent.

I.e., the invention makes it possible to provide effective control of a plurality of transmission switch elements with a small number of switch elements in a manner acting on all transmission switch elements.

In one embodiment of the invention, the sunroof further has a second set of transmission switch elements, wherein the transmission switch elements of the second set are arranged one behind the other, wherein a first peripheral transmission switch element and a second peripheral transmission switch element are provided, wherein the first peripheral transmission switch element of the second set is adjacent the second peripheral transmission switch element of the first set, comprising the step of receiving a sequence of first switching states of the second switch element within a predetermined time, wherein, following that, a first switching state of the first switch element is received within a predetermined time, wherein, if all transmission switch elements of the second set are opaque, the second peripheral transmission switch element is switched to transparent; if all transmission switch elements of the second set are transparent, the second peripheral transmission switch element is switched to opaque; if the first peripheral transmission switch element is opaque and the second peripheral transmission switch element is transparent, the transmission switch element that is immediately adjacent a transparent transmission switch element of the second set is switched to transparent; and the step of receiving a first switching state of the second switch element within a predetermined time, wherein, if all transmission switch elements of the second set are opaque, the first peripheral transmission switch element is switched to transparent; if all transmission switch elements of the second set are transparent, the first peripheral transmission switch element is switched to opaque; if the second peripheral transmission switch element is opaque and the first peripheral transmission switch element is transparent, the transmission switch element that is immediately adjacent a transparent transmission switch element of the second set is switched to transparent.

I.e., by means of the invention, one pane can even be subdivided into subsets, wherein the subsets can be controlled separately or as a unified set. This increases the flexibility of the control for the user.

In another embodiment of the invention, the method further has the step of receiving a sequence of first switching states of the first switch element within a predetermined time, wherein, if the first peripheral transmission switch element of the second set is transparent, all transmission switch elements of the second set are switched to opaque; if the first peripheral transmission switch element of the second set is opaque, all transmission switch elements of the first set are switched to transparent.

According to another embodiment of the invention, a sunroof having a plurality of assigned electrically controlled transmission switch elements of a first set is provided, wherein the transmission switch elements of the first set are arranged one behind the other, wherein a first peripheral transmission switch element and a second peripheral transmission switch element are provided, wherein, at least one first switch element and one second switch element are available for control, wherein the first switch element and the second switch element are set up to control a method according to the invention.

I.e., the invention makes it possible to provide effective control of a plurality of transmission switch elements with a small number of switch elements in a shift-like sequence in both directions.

According to another embodiment, the sunroof further has a second set of transmission switch elements, wherein the transmission switch elements of the second set are arranged one behind the other, wherein a first peripheral transmission switch element and a second peripheral transmission switch element are provided, wherein the first peripheral transmission switch element of the second set is adjacent the second peripheral transmission switch element of the first set, wherein at least one first switch element and one second switch element are available for control, wherein the first switch element and the second switch element are set up to control a method according to the invention.

I.e., by means of the invention, one pane can even be subdivided into subsets, wherein the subsets can be controlled separately or as a unified set. This increases the flexibility of control for the user.

According to another embodiment of the invention, the first switch element and the second switch element are arranged on one side of the sunroof or on a graphical user interface.

According to yet another embodiment of the invention, the transmission switch elements comprise PDLC elements.

Without loss of generality, the invention also makes it possible to provide vehicles with a pane according to the invention. In particular, the vehicle can be a land, water, air, or spacecraft, without excluding mixed forms thereof.

The invention is explained in detail in the following with reference to drawings and exemplary embodiments. The drawings are schematic representations and are not to scale. The drawings in no way restrict the invention.

Figure 2:
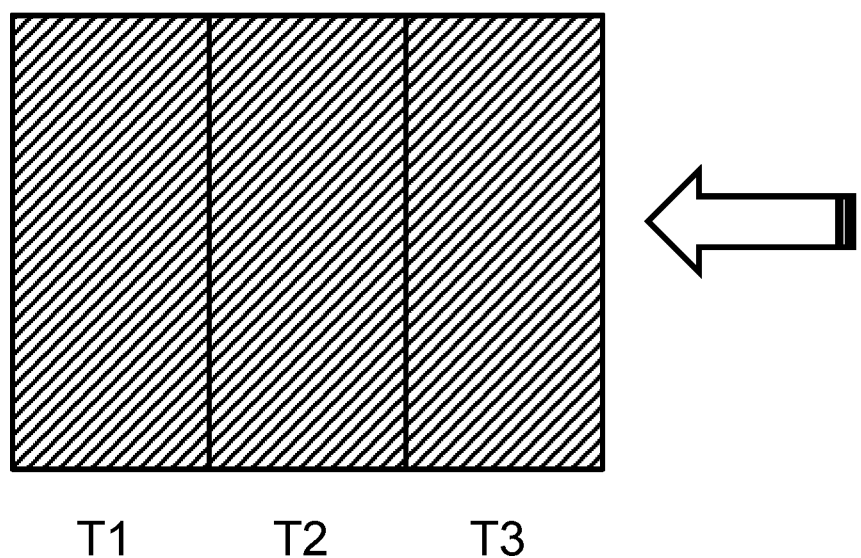
Figure 3:
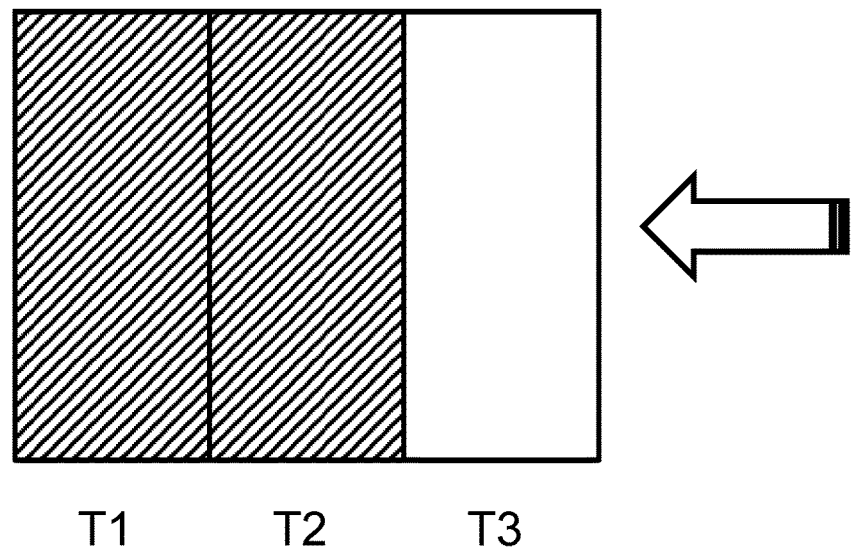
Figure 4:
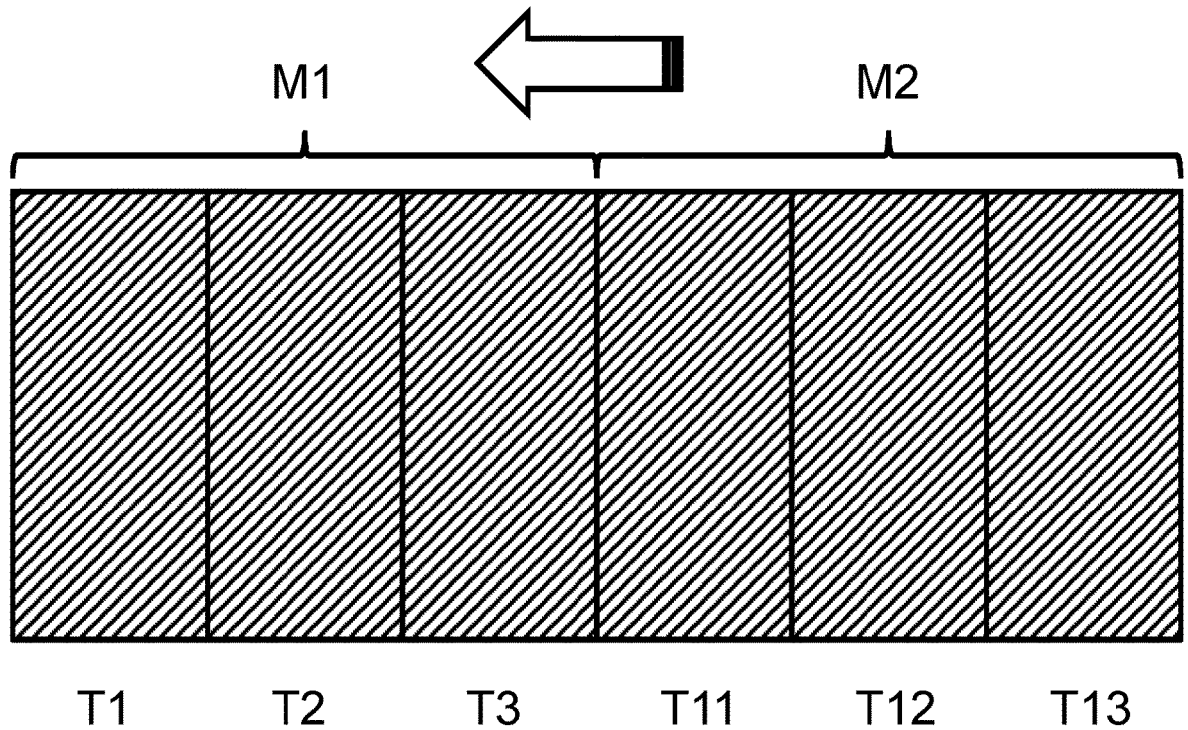
Figure 5:
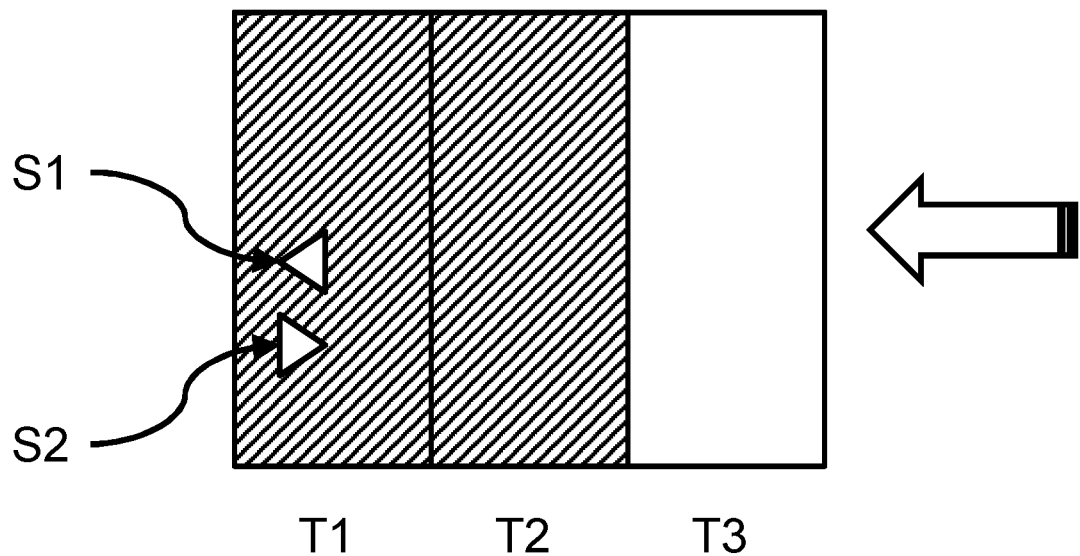
Figure 6:
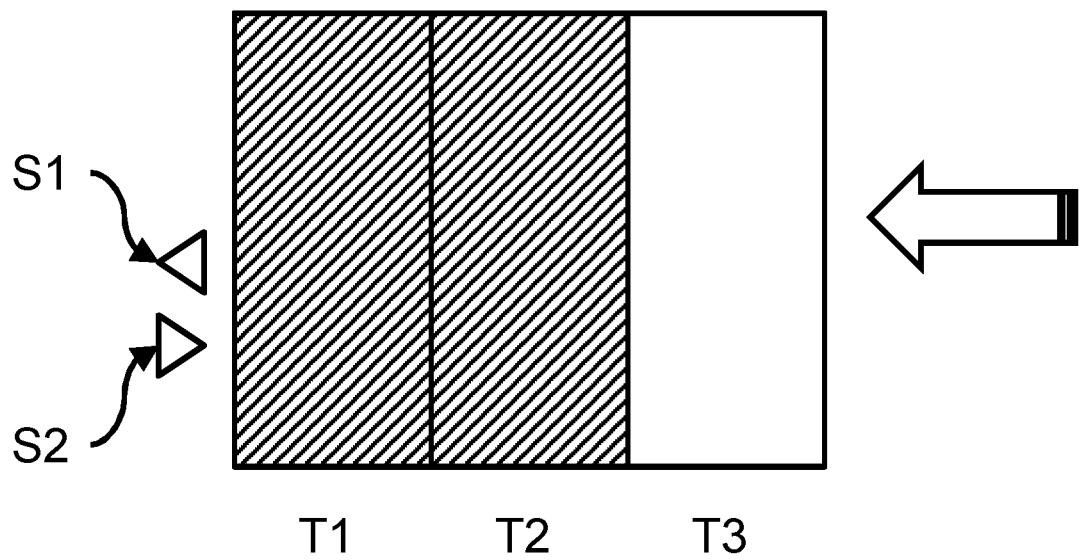
Figure 7:
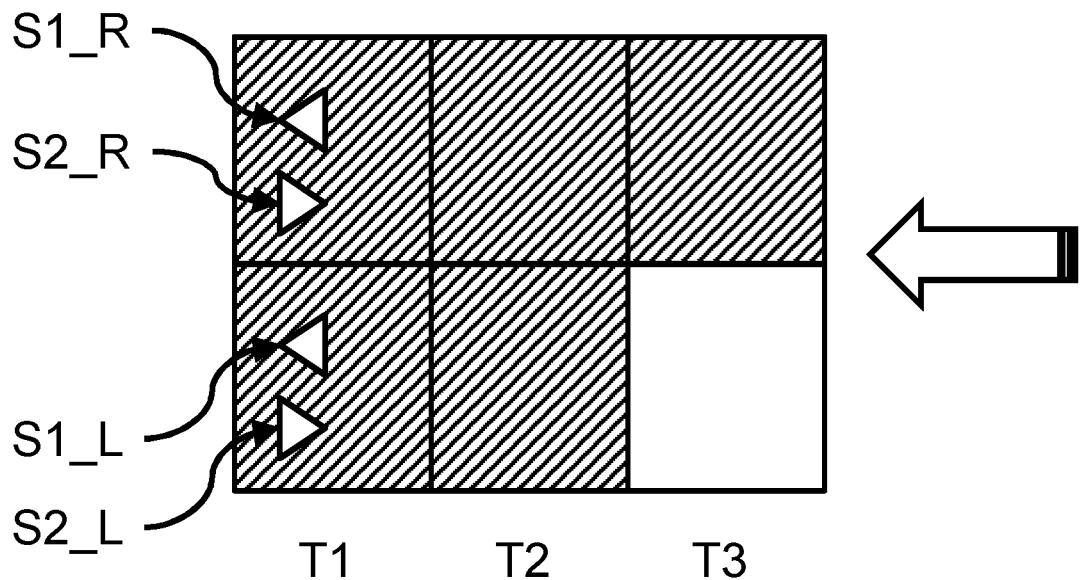
Figure 8:
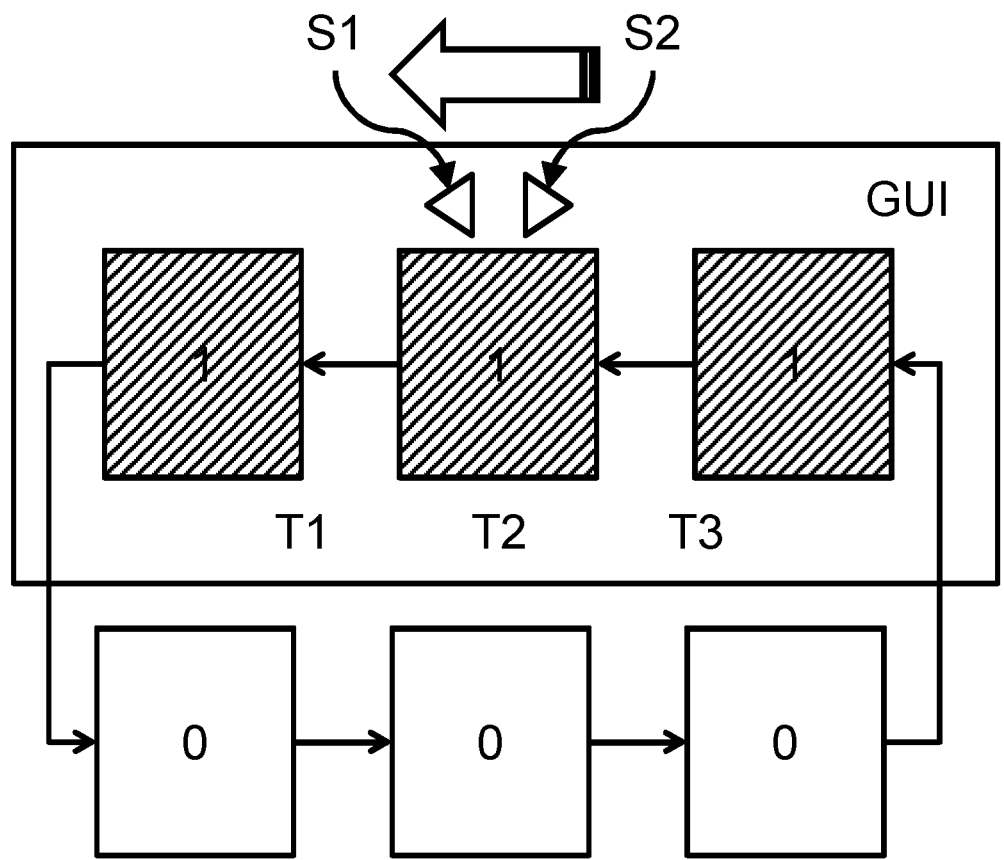

They depict:

FIG. 1 a schematic sequence of a method for control in accordance with aspects of the invention, FIG. 2 a schematic view of a sunroof with electrically controlled transmission switch elements in accordance with aspects of the invention in a first state, FIG. 3 a schematic view of the sunroof with electrically controlled transmission switch elements of FIG. 1 in a second state, FIG. 4 a schematic view of a sunroof with electrically controlled transmission switch elements in accordance with further aspects of the invention, FIG. 5 a schematic view of a control system of a sunroof with electrically controlled transmission switch elements in accordance with one embodiment of the invention, FIG. 6 a schematic view a control system of a sunroof with electrically controlled transmission switch elements in accordance with another embodiment of the invention FIG. 7 a schematic view of a sunroof with electrically controlled transmission switch elements in accordance with other aspects of the invention, and FIG. 8 a schematic representation of a user interface in relation to the control of a sunroof with electrically controlled transmission switch elements in accordance with another embodiment of the invention.

In the following, the invention will be presented in more detail with reference to the figures. It should be noted that various aspects are described that can, in each case, be used individually or in combination. In other words, any aspect can be used with different embodiments of the invention unless explicitly presented as a pure alternative.

Furthermore, for the sake of simplicity, in the following, reference is, as a rule, always made to only one entity. However, if not explicitly noted, the invention can in each case also have a plurality of the entities concerned. Thus, the use of the words "a" and "an" is to be understood only as an indication that, in a simple embodiment, at least one entity is used.

Insofar as methods are described in the following, the individual steps of a method can be arranged and/or combined in any order unless the context explicitly indicates otherwise.

Furthermore, the methods can be combined with one another—unless explicitly indicated otherwise.

Data with numerical values are usually not to be construed as exact values, but also contain a tolerance from +/−1% up to +/−10%.

Insofar as standards, specifications, or the like are mentioned in this application, at least the standards, specifications, or the like applicable on the filing date are always referenced. I.e., if a standard/specification, etc. is updated or superseded, the invention is also applicable thereto.

Various embodiments are depicted in the figures. Insofar as reference is made in the figures and in the associated description to "front"/"rear"/"right" and "left", it is assumed in the following that a possible (primary) direction of travel when used in the vehicle is indicated by the arrow. I.e., "front" is in the direction of the arrow and, based thereon, the direction of view is "left" at the bottom of the figure and "right" at the top of the figure.

In the following description insofar as the terms "transmission switch element", "transparent", and "opaque" are used, this refers to any influence on transparency. In this context, a change in color can also result in influencing transparency in a limited wavelength range (of visible light). I.e., a transmission switch element be changed, binarily or in stages, from, in particular in the visible light range, an at least partially transparent state to a less strongly transparent ("opaque") state. For this purpose, a suitable voltage or a suitable current relative to the respective transmission switch element can be fixed. In embodiments of the invention, the transmission switch elements are implemented as a liquid crystal element, in particular as a polymer-dispersed liquid crystal element PDLC) or as a polymer-dispersed network display (PNLC), or as an electrochromic transmission switch element.

FIGS. 2, 3, 5, and 6 depict an exemplary sunroof according to the invention with a first set M1 of assigned electrically controlled transmission switch elements T1, T2, T3. The exact number of switchable elements within the first set M1 can also be higher or lower.

FIG. 4 depicts another exemplary sunroof according to the invention with a first set M1 of assigned electrically controlled transmission switch elements T1, T2, T3 and a second set M2 of assigned electrically controlled transmission switch elements T11, T12, T13. The exact number of switchable elements within the first set M1 or within the second set M2 can also be higher or lower. I.e., here, the sets are arranged one behind the other.

FIG. 7 depicts another exemplary sunroof according to the invention. However, here the first sets M1, which can be controlled independently of one another, are shown adjacent one another in the direction of travel. Correspondingly, respective switch elements S1_L, S2_L, or S1_R, S2_R can be provided for the adjacent sets. In a motor vehicle, provision can also be made for the driver's control (e.g., in the case of left-hand drive S1_L, S2_L) to act as master control on the adjacent sets.

In the following, the control will be explained initially only with reference to a first set M1. This control can be used in all embodiments of the invention.

The sunroof according to the invention has at least a plurality of assigned electrically controlled transmission switch elements T1, T2, T3 in a first set M1, wherein the transmission switch elements T1, T2, T3 of the first set M1 are arranged one behind the other (in the direction of travel).

In the following, we assume 3 elements within the first set M1. Then, T1 forms a first peripheral transmission switch element (front); and T2, a second peripheral transmission switch element (rear).

At least one first switch element S1 and one second switch element S2 are available for control.

Switch elements S1, S2 can be arranged as independent switch elements at suitable locations (in the vehicle) as depicted in FIGS. 6 and 7, and/or integrated into the pane as switch elements—as depicted in FIG. 5—, and/or made available via a graphical user interface GUI—as depicted in FIG. 8—, which is suitable for wired or wireless control. Similarly, the switch elements S1, S2 can also be integrated in a combined rotary or rocker switch. Without loss of generality, switching can also be effected by speech recognition.

The first switch element S1 and the second switch element S2 are set up to control methods that are explained below.

For example, in a step 100, a first switching state of the first switch element S1 is received within a predetermined time. Depending on the previous state of the transmission switch elements T1, T2, T3, switching to a new state is now initiated.

If all transmission switch elements T1, T2, T3 of the first set M1 are opaque, the second peripheral transmission switch element T3 is switched to transparent. If, on the contrary, all transmission switch elements T1, T2, T3 of the first set M1 are transparent, the second peripheral transmission switch element T3 is switched to opaque. If, however, the first peripheral transmission switch element T1 is opaque and the second peripheral transmission switch element T3 is transparent, the transmission switch element T2 that is immediately adjacent a transparent transmission switch element of the first set is switched to transparent.

If, on the contrary, in step 200, a first switching state of the second switch element S2 is received within a predetermined time, then, depending on the previous state of the transmission switch elements T1, T2, T3, another switching to a new state is now initiated.

If all transmission switch elements T1, T2, T3 of the first set M1 are opaque, the first peripheral transmission switch element T1 is switched to transparent. If, on the contrary, all transmission switch elements T1, T2, T3 of the first set M1 are transparent, the first peripheral transmission switch element T1 is switched to opaque. If, however, the second peripheral transmission switch element T3 is opaque and the first peripheral transmission switch element T1 is transparent, the transmission switch element T2 that is immediately adjacent a transparent transmission switch element of the first set is switched to transparent.

Obviously, the set M1 can also contain more transmission switch elements. In that case, the transmission switch elements are switched in a curtain-like manner, increasing and decreasing respectively, in that a change from one state to another state occurs at the boundary between opaque and transparent transmission switch elements.

I.e., the invention makes it possible to control the transparency properties in a variety of ways for occupants of a vehicle. For example, only one subregion can be switched to "opaque"; whereas a different region is switched to "transparent". The control can be designed to be extremely space-saving. I.e., the invention enables effectively controlling a plurality of transmission switch elements with a small number of switch elements in a shift-like sequence in both directions.

In one embodiment of the method, provision can also be made for not just one single switching state, but, instead, fora sequence of switching states to be detected within a predetermined time.

A sequence of switching states can also be realized by continuous switching within the predetermined time. In that case, for example, a continuous switching state can be recognized as a single edge change within a predetermined time, whereas a single switching state can be recognized as a double edge change. Of course, this does not preclude other implementations. Rather, a single switching state and sequences of switching states can be understood as distinguishable actions on a single switch element.

For example, the method can further include the step of receiving 300 a sequence of first switching states of the first switch element S1 within a predetermined time, wherein, if the first peripheral transmission switch element T1 is transparent, all transmission switch elements T1, T2, T3 of the first set are switched to opaque; and if the first peripheral transmission switch element T1 is opaque, all transmission switch elements T1, T2, T3 of the first set are switched to transparent.

I.e., the invention makes available effective control of a plurality of transmission switch elements with a small number of switch elements in a manner acting on all transmission switch elements.

If the sunroof further has a second set M2 of transmission switch elements T11, T12, T13, the transmission switch elements T11, T12, T13 of the second set M2 can likewise be arranged one behind the other, as depicted in FIG. 4, wherein a first peripheral transmission switch element T11 of the second set M2 and a second peripheral transmission switch element T13 of the second set M2 are provided, wherein the first peripheral transmission switch element T11 of the second set M2 is adjacent the second peripheral transmission switch element T3 of the first set M1.

I.e., by means of the invention, a pane can even be subdivided into subsets, wherein the subsets can be controlled separately or as a unified set. This increases the flexibility of control for the users.

In this case, the method can additionally include the step of receiving 400 a sequence of first switching states of the second switch element S2 within a predetermined time. When, after that, a first switching state of the first switch element S1 is received 500 within a predetermined time, then, depending on the previous state of the transmission switch elements T11, T12, T13 of the second set, another switching to a new state is now initiated.

If all transmission switch elements T11, T12, T13 of the second set M2 are opaque, the second peripheral transmission switch element T13 is switched to transparent. If, on the contrary, all transmission switch elements T11, T12, T13 of the second set M2 are transparent, the second peripheral transmission switch element T13 is switched to opaque. If, however, the first peripheral transmission switch element T11 is opaque and the second peripheral transmission switch element T13 is transparent, the transmission switch element T12 that is immediately adjacent a transparent transmission switch element of the second set is switched to transparent.

If, on the contrary, subsequent to step 400, a first switching state of the second switch element S2 is received 600 within a predetermined time, then, depending on the previous state of the transmission switch elements T11, T12, T13 of the second set, another switching to a new state is now initiated.

If all transmission switch elements T11, T12, T13 of the second set M2 are opaque, the first peripheral transmission switch element T11 is switched to transparent. If, on the contrary, all transmission switch elements T11, T12, T13 of the second set M2 are transparent, the first peripheral transmission switch element T11 is switched to opaque.

If, however, the second peripheral transmission switch element T13 is opaque and the first peripheral transmission switch element T11 is transparent, the transmission switch element T12 that is immediately adjacent a transparent transmission switch element of the second set M2 is switched to transparent.

In another embodiment of the method, provision can also be made for not just a single switching state to be detected, but, instead, a sequence of switching states.

For example, provision can also be made for a sequence of first switching states of the first switch element S1 to be received within a predetermined time in a step 700. If the first peripheral transmission switch element T11 of the second set M2 is transparent, all transmission switch elements T11, T12, T13 of the second set are switched to opaque; if the first peripheral transmission switch element T11 of the second set M2 is opaque, all transmission switch elements T11, T12, T13 of the first set are switched to transparent.

It should also be noted here that, for example, the second set M2 (e.g., for the occupants in the rear) can also have separate control by means of its own switch elements. In a motor vehicle, provision can also be made for the control of the first set M1 to act as a master control for the sets behind it.

It should be noted here that the aforementioned idea can also be combined with different panes of a vehicle. For example, the control can also include a front window (e.g., in the form of a switchable sun visor wedge) and/or a rear window. In other words, the second set M2 could also be arranged (at least partially) on a rear window or the first set M1 could also be arranged (at least partially) on a front window.

In one embodiment of the invention, the switch elements are arranged on a graphical user interface GUI. By actuating switch elements on the GUI, the switching of states can be initiated. The switch elements can also be implemented as gesture recognition ("swiping"). Without loss of generality, switching can also be effected by speech recognition.

With reference to FIG. 8, it is also possible to illustrate an annular buffer-like control. The control can be viewed as a shift register which makes available twice the number of cells that are available as transmission switch elements (per set). A binary mask ("111") corresponding to the number of transmission switch elements is shifted through these, wherein a "1" is a first state, e.g. opaque, and "0" is a second state, e.g. transparent. By means of a shifting operation, the direction in which the transmission switch elements become "opaque" or "transparent" can be specified appropriately. For example, by pressing S1 in the direction of the arrows, in that the cell corresponding to the transmission switch element T3 changes from "1" to "0", while the leading "1" is pushed out of the cell corresponding to the transmission switch element T1 into the following unswitched cell. If, on the contrary, the switch element S2 is pressed instead of S1, the direction is reversed.

Without loss of generality, the invention makes it possible to provide vehicles with a pane according to the invention. In particular, the vehicle can be a land, water, air, or spacecraft, without excluding mixed forms thereof.

Although the invention has been described above with reference to a sunroof, the concept of the invention is also applicable in the same manner for glazing in buildings, etc.

The control presented affords the user intuitive operation. The control allows lamellar control of the transmission switch elements. Depending on the selection of the predetermined time, the "opaque" part of the transmission switch element is increased or decreased for the transmission switch element in its overall effect on the user. In other words, there is a gradual change with a normal switching state change, as a result of which the user's eyes can become accustomed more slowly to the change in light. I.e., the change can be perceived as a progression.

Depending on the technology used for the transmission switch elements, each individual transmission switch element that is intended to change its state can additionally be equipped with a fading effect. This also results in a gradual change, as a result of which the user's eyes can become accustomed more slowly to the change in light.

The control can, however, even provide that, e.g., by pressing on both switch elements, the size of the "opaque" region can be adapted. For example, by pressing both switch elements, a change mode can be activated in which the size of the "opaque" region can be enlarged by pressing switch element S1 again, whereas by pressing switch element S2 again, the size of the "opaque" region is reduced. This can be done, for example, by changing the bit mask. The change mode can be exited by pressing both switch elements S1, S2 again. Alternatively, or additionally, the change mode can also be exited automatically after a predetermined time such that the switch elements S1, S2 regain their previous function.

The exact form of the transmission switch elements is illustrated only by way of example. Other forms can be realized in the same way.

LIST OF REFERENCE CHARACTERS

T1, T2, T3, T11, T12, T13 electrically controllable transmission switch elements
M1, M2 set
S1, S2 switch element
GUI graphical user interface
Method Steps
100 Receiving a first switching state of the first switch element 200 Receiving a first switching state of the second switch element 300 Receiving a sequence of first switching states of the first switch element 400 Receiving a sequence of first switching states of the second switch element 500 Receiving a first switching state of the first switch element 600 Receiving a first switching state of the second switch element 700 Receiving a sequence of first switching states of the first switch element

The invention claimed is:

1. A method for controlling a plurality of assigned electrically controlled transmission switch elements of a first set in a vehicle sunroof, wherein the transmission switch elements of the first set are arranged one behind the other, wherein a first peripheral transmission switch element and a second peripheral transmission switch element of the first set of transmission switch elements are provided, wherein at least one first switch element and at least one second switch element are available for control, the method comprising:

receiving a first switching state of the first switch element within a predetermined time, wherein, as a result of said receiving of said first switching state of the first switching element, the transmission switch elements are controlled as follows:
 if all transmission switch elements of the first set are opaque, the second peripheral transmission switch element is switched to transparent,
 if all transmission switch elements of the first set are transparent, the second peripheral transmission switch element is switched to opaque,
 if the first peripheral transmission switch element is opaque and the second peripheral transmission switch element is transparent, the transmission switch element that is immediately adjacent a transparent transmission switch element of the first set is switched to transparent, receiving a first switching state of the second switch element within a predetermined time, wherein, as a result of said receiving of said first switching state of the second switching element, the transmission switch elements are controlled as follows:
 if all transmission switch elements of the first set are opaque, the first peripheral transmission switch element is switched to transparent,
 if all transmission switch elements of the first set are transparent, the first peripheral transmission switch element is switched to opaque,
 if the second peripheral transmission switch element is opaque and the first peripheral transmission switch element is transparent, the transmission switch element that is immediately adjacent a transparent transmission switch element of the first set is switched to transparent.

2. The method according to claim 1, further comprising receiving a sequence of first switching states of the first switch element within a predetermined time, wherein,
 if the first peripheral transmission switch element is transparent, all transmission switch elements of the first set are switched to opaque,
 if the first peripheral transmission switch element is opaque, all transmission switch elements of the first set are switched to transparent.

3. The method according to claim 1, wherein the sunroof further comprises a second set of transmission switch elements, wherein the transmission switch elements of the second set are arranged one behind the other, wherein a first peripheral transmission switch element and a second peripheral transmission switch element of the second set of transmission switch elements are provided, wherein the first peripheral transmission switch element of the second set is adjacent the second peripheral transmission switch element of the first set, the method further comprising receiving a sequence of first switching states of the second switch element within a predetermined time, with, following that
 receiving a first switching state of the first switch element within a predetermined time, wherein, as a result of said receiving of said first switching state of the first switching element, the transmission switch elements are controlled as follows:
  if all transmission switch elements of the second set are opaque, the second peripheral transmission switch element is switched to transparent,
  if all transmission switch elements of the second set are transparent, the second peripheral transmission switch element is switched to opaque,
  if the first peripheral transmission switch element is opaque and the second peripheral transmission switch element is transparent, the transmission switch element that is immediately adjacent a transparent transmission switch element of the second set is switched to transparent,
 receiving a first switching state of the second switch element within a predetermined time, wherein, as a result of said receiving of said first switching state of the second switching element, the transmission switch elements are controlled as follows:
  if all transmission switch elements of the second set are opaque, the first peripheral transmission switch element is switched to transparent,
  if all transmission switch elements of the second set are transparent, the first peripheral transmission switch element is switched to opaque,
  if the second peripheral transmission switch element is opaque and the first peripheral transmission switch element is transparent, the transmission switch element that is immediately adjacent a transparent transmission switch element of the second set is switched to transparent.

4. The method according to claim 3, further comprising receiving a sequence of first switching states of the first switch element within a predetermined time, wherein,
 if the first peripheral transmission switch element of the second set is transparent, all transmission switch elements of the second set are switched to opaque,
 if the first peripheral transmission switch element of the second set is opaque, all transmission switch elements of the first set are switched to transparent.

5. A sunroof with a plurality of assigned electrically controlled transmission switch elements of a first set, wherein the transmission switch elements of the first set are arranged one behind the other, wherein a first peripheral transmission switch element and a second peripheral transmission switch element of the first set of transmission switch elements are provided, wherein at least one first switch element and one second switch element are available for control, wherein the first switch element and the second switch element are set up to control a method according to claim 1.

6. The sunroof according to claim 5, further comprising a second set of transmission switch elements, wherein the transmission switch elements of the second set are arranged one behind the other, wherein a first peripheral transmission switch element and a second peripheral transmission switch element of the second set of transmission switch elements are provided, wherein the first peripheral transmission switch element of the second set is adjacent the second peripheral transmission switch element of the first set, wherein at least one first switch element and one second switch element are available for control, wherein the first switch element and the second switch element are set up to control a method according to claim 1.

7. The sunroof according to claim 5, wherein the first switch element and the second switch element are arranged on one side of the sunroof or on a graphical user interface.

8. The sunroof according to claim 5, wherein the transmission switch elements comprise PDLC elements.

9. A vehicle with a sunroof according to claim 5.

10. The vehicle according to claim 9, wherein the vehicle is a land, water, air, or spacecraft.

* * * * *

UNITED STATES PATENT AND TRADEMARK OFFICE
CERTIFICATE OF CORRECTION

| | | |
|---|---|---|
| PATENT NO. | : 11,981,189 B2 | Page 1 of 1 |
| APPLICATION NO. | : 17/426021 | |
| DATED | : May 14, 2024 | |
| INVENTOR(S) | : Florian Manz et al. | |

It is certified that error appears in the above-identified patent and that said Letters Patent is hereby corrected as shown below:

On the Title Page

In Item (72) Inventors, the second inventor's residence should read:
Florian Manz, Aachen (DE), Rayan Hammoud, Köln, (DE)

Signed and Sealed this
Twenty-fifth Day of June, 2024

*Katherine Kelly Vidal*

Katherine Kelly Vidal
*Director of the United States Patent and Trademark Office*